(12) United States Patent  
Makuszewski

(10) Patent No.: US 7,540,144 B2  
(45) Date of Patent: Jun. 2, 2009

(54) BLEED VALVE FOR A GAS TURBINE ENGINE

(75) Inventor: Jerzy Makuszewski, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 585 days.

(21) Appl. No.: 11/254,801

(22) Filed: Oct. 21, 2005

(65) Prior Publication Data

US 2007/0089429 A1    Apr. 26, 2007

(51) Int. Cl.
*F02C 7/00* (2006.01)
*F02K 3/02* (2006.01)

(52) U.S. Cl. .................................. 60/226.1; 60/785

(58) Field of Classification Search ............... 60/226.1, 60/262, 782, 785; 415/145
See application file for complete search history.

(56) References Cited

U.S. PATENT DOCUMENTS

| | | | |
|---|---|---|---|
| 3,108,767 A | * | 10/1963 | Eltis et al. .................. 60/785 |
| 3,360,189 A | | 12/1967 | Cook |
| 3,849,020 A | | 11/1974 | Eastman |
| 3,909,152 A | | 9/1975 | Rannenberg |
| 4,280,678 A | | 7/1981 | Roberts |
| 4,574,585 A | | 3/1986 | Conn |
| 4,715,779 A | * | 12/1987 | Suciu .......................... 60/785 |
| 5,477,673 A | | 12/1995 | Blais et al. |
| 6,048,171 A | | 4/2000 | Donnelly et al. |
| 6,122,905 A | | 9/2000 | Liu |
| 6,622,475 B2 | | 9/2003 | Brault et al. |
| 6,695,578 B2 | | 2/2004 | Winslow et al. |
| 6,755,025 B2 | | 6/2004 | Eleftheriou et al. |
| 6,802,691 B2 | | 10/2004 | Chlus |

\* cited by examiner

*Primary Examiner*—Louis J Casaregola
(74) *Attorney, Agent, or Firm*—Ogilvy Renault LLP

(57) ABSTRACT

A bleed valve for a gas turbine engine having a chamber inward of the bypass flow path and in fluid flow communication with the bypass and primary flow paths, a valve member for alternatively closing and opening the fluid flow communication with the primary flow path remaining inward of the bypass flow path, and an actuator actuating the valve member across the bypass flow path.

15 Claims, 6 Drawing Sheets

BLEED VALVE FOR A GAS TURBINE ENGINE

TECHNICAL FIELD

The invention relates generally to gas turbine engines and, more particularly, to an improved bleed valve for a gas turbine engine.

BACKGROUND OF THE ART

Gas turbine engines usually include bleed valves in the engine casing forward of the burner which, when an engine surge is imminent, open to rematch the compressor stages. Valves including ports in the compressor casing which open via a movable valve element are often used, and valves removable from the outside of the engine are desirable for ease of maintenance.

Typical bleed valves include a valve element selectively movable to an opened position where it protrudes in the bypass flow path to open a port in the bypass flow path wall communicating with the primary flow path, such that fluid from the primary flow path can be evacuated to the bypass flow path. The protruding valve element in the bypass flow path can produce perturbations within the bypass airflow which are detrimental to engine performances.

SUMMARY OF THE INVENTION

It is therefore an object of this invention to provide an improved bleed valve which addresses the above mentioned concerns.

In one aspect, the present invention provides a compressor bleed valve arrangement for a gas turbine engine having a central axis, the compressor bleed valve arrangement comprising a bleed valve for selectively bleeding air from a main flow path to a bypass flow path, the main flow path being located inwardly of the bypass flow path relative to the central axis of the gas turbine engine, the bleed valve being accessible from an outward side of the bypass flow path relative to the central axis, the bleed valve having a static valve body extending across the bypass flowpath and housing a mobile valve assembly moveable therewithin between closed and open positions, the mobile valve assembly being isolated from the bypass flow path by the static valve body.

In another aspect, the present invention provides a bleed valve comprising: a valve body having first and second superposed housings, the first housing including at least one first wall forming a first closed perimeter and extending between a second wall and a third wall, the second housing including at least one fourth wall forming a second closed perimeter and extending from the second wall opposite the first wall to define an open end, and a valve seat connected to one of the first and fourth walls within the respective housing, the first and second housings being in fluid flow communication through at least one first opening defined in the second wall, the first wall having at least one second opening defined therethrough between the third wall and the valve seat; and a valve member moveable between a first position in sealing engagement with the valve seat for preventing a fluid from circulating from the open end to the second opening, and a second position away from the valve seat allowing the fluid to circulate from the open end to the second opening, the valve member moving between the first and second positions while remaining within at least one of the first and second housings.

In another aspect, the present invention provides bleed valve for a gas turbine engine, the gas turbine engine having a bypass flow path and a primary flow path located inwardly of the bypass flow path, the bleed valve comprising: a chamber located outside and inwardly of the bypass flow path, the chamber being defined by a first wall having at least one opening defined therein and providing a first fluid flow communication between the chamber and the bypass flow path, at least one second wall extending from the first wall and forming a closed perimeter, and a valve seat connected to the at least one second wall, the valve seat bordering a second fluid flow communication between the chamber and the primary flow path; a valve member for selectively closing and opening the second fluid flow communication through respectively engagement with and disengagement from the valve seat, the valve member being located outside and inwardly of the bypass flow path when closing and opening the second fluid flow communication; and an actuator actuating the valve member to alternatively close and open the second fluid flow communication, the actuator actuating the valve member across the bypass flow path.

In accordance with a still further general aspect of the present invention, there is provided a bleed valve for selectively providing a fluid flow communication between first and second flow paths, the bleed valve comprising: a hollow static portion extending across the first flow path and protruding therefrom; and a mobile valve assembly selectively opening and closing the fluid flow communication between the first and second flow paths, the mobile valve assembly being located within the hollow static portion to be moveable without perturbing a fluid flow within the first flow path.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
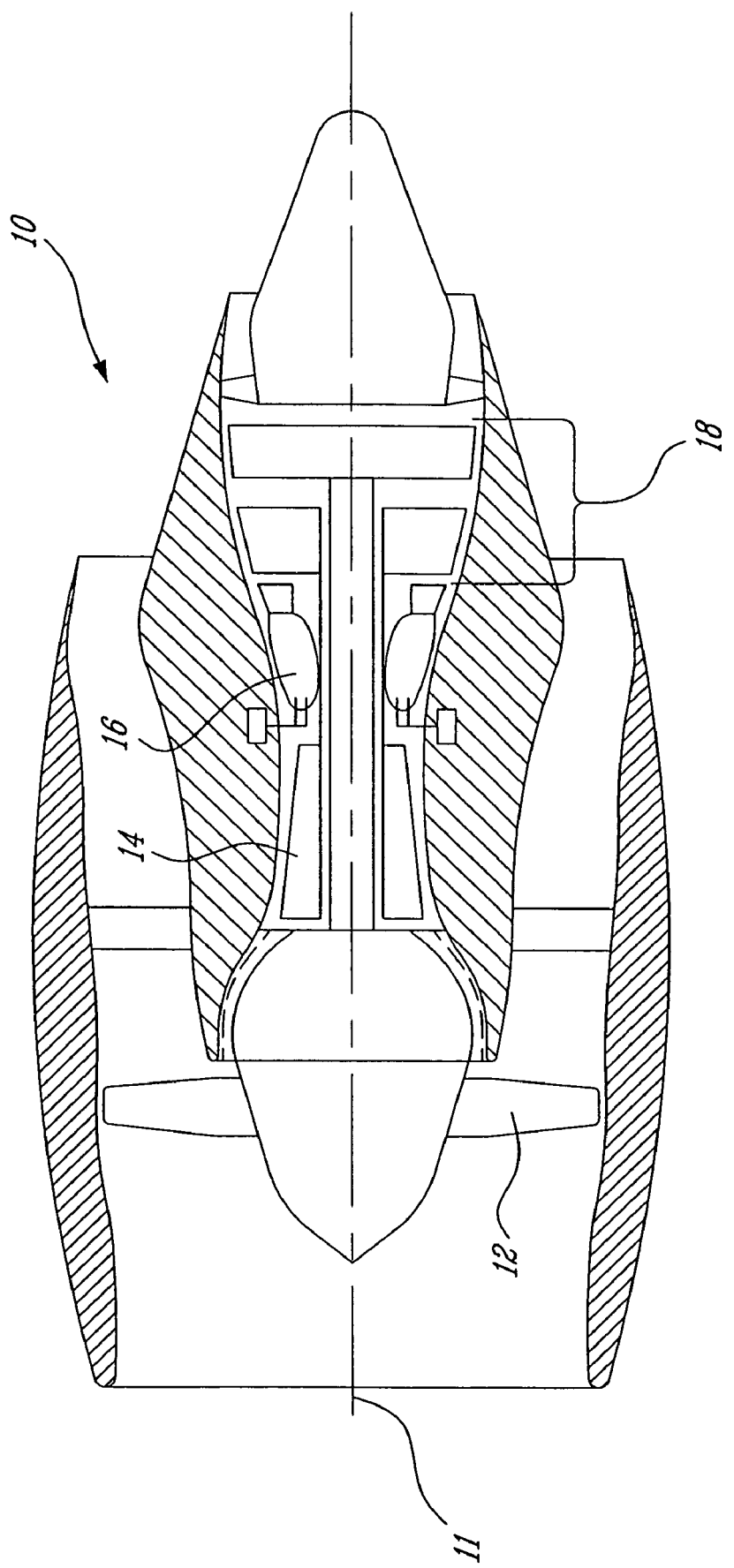
FIG. 1 is a side view of a gas turbine engine, in partial cross-section.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
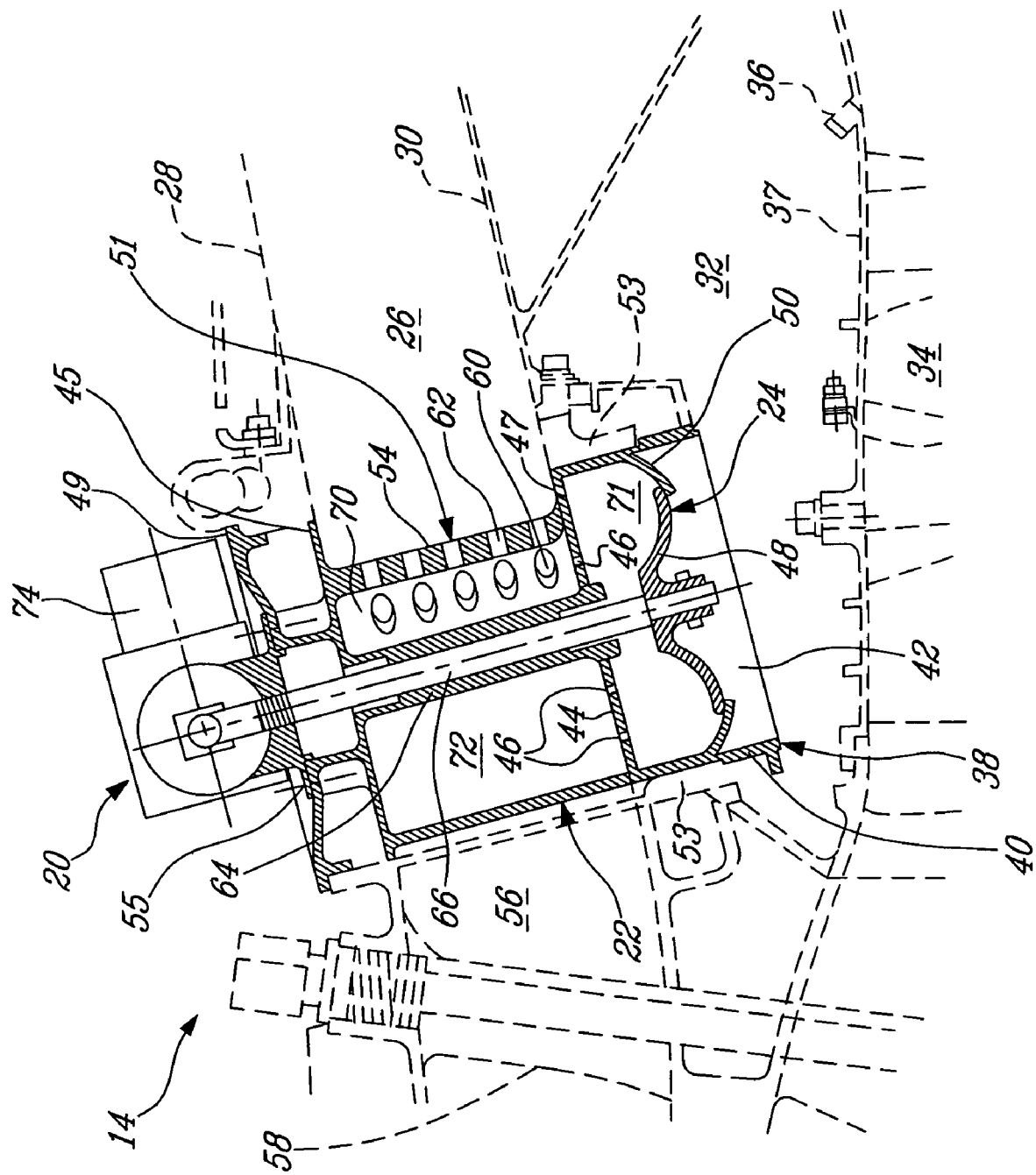
FIG. 2 is a side cross-sectional view of a bleed valve according to an embodiment of the present invention, showing the valve in a closed position and installed in a portion of a gas turbine engine such as illustrated in FIG. 1.
Figure 3:
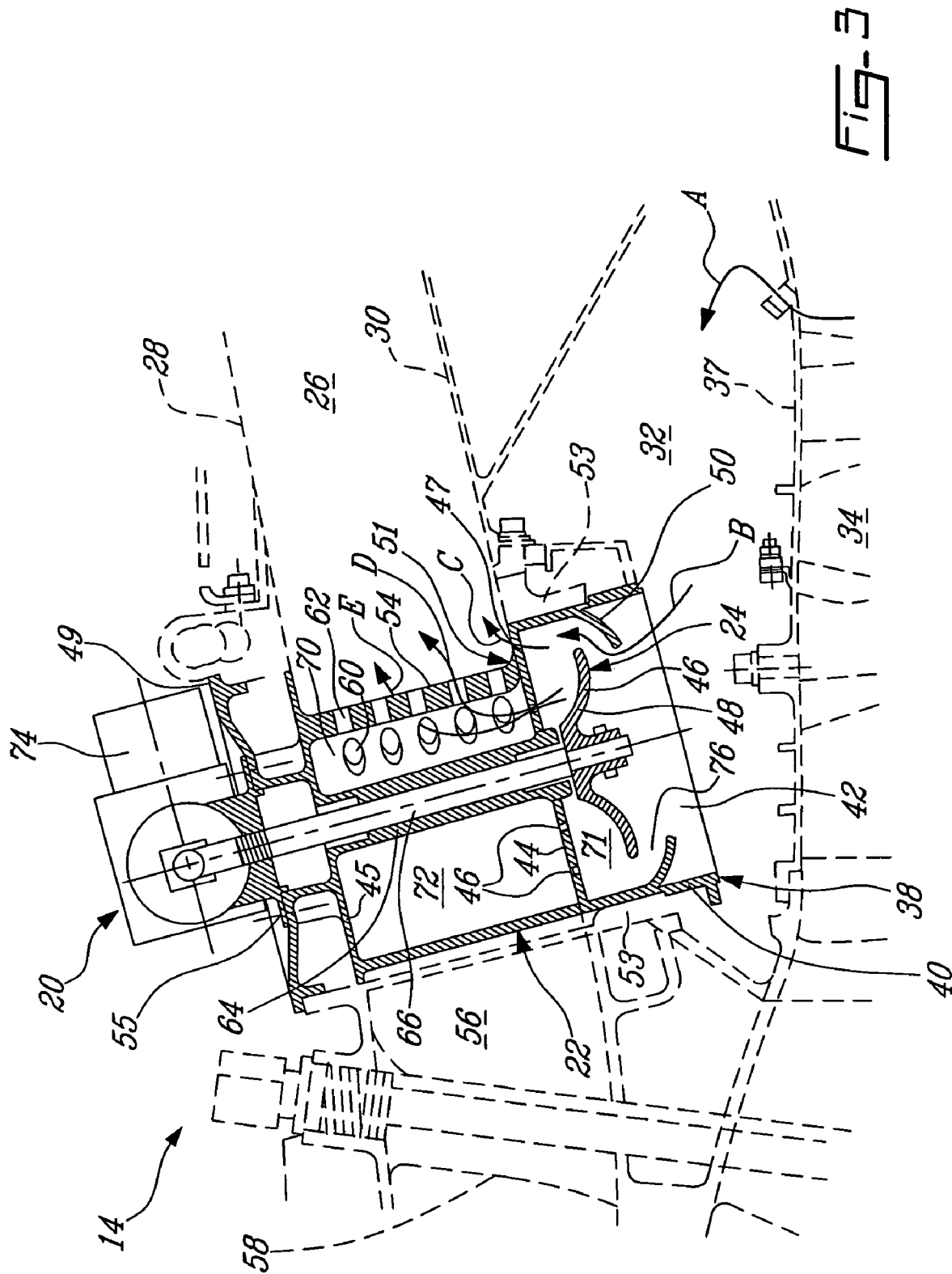
FIG. 3 is a side cross-sectional view of the bleed valve and portion of the gas turbine engine of FIG. 2 showing the valve in an opened position.

Referring to FIGS. 2-3, the multistage compressor 14 (only part of which is shown) comprises an outer shroud 28 and an inner shroud 30 located inwardly of the outer shroud 28, with a bypass flow path 26 being defined therebetween. The compressor 14 also comprises an outer wall 37 located inwardly of the inner shroud 30, and an inner wall (not shown) located inwardly of the outer wall 37. A plenum 32 is defined between the inner shroud 30 and the outer wall 37, and a primary flow path 34 is defined between the inner wall and the outer wall 37. A flow of compressed air circulates through the primary flow path 34, which is in fluid flow communication with the plenum 32 through a plurality of openings 36 in the outer wall 37, only one of which being shown in FIGS. 2-3. In the present specification, the terms "inward", "outward", and other related terms are defined with respect to the central axis 11 of the engine 10 (see FIG. 1), an element indicated as being "inward" of another being closer to the engine central axis 11, and an element indicated as being "outward" of another being farther therefrom.

Figure 4:
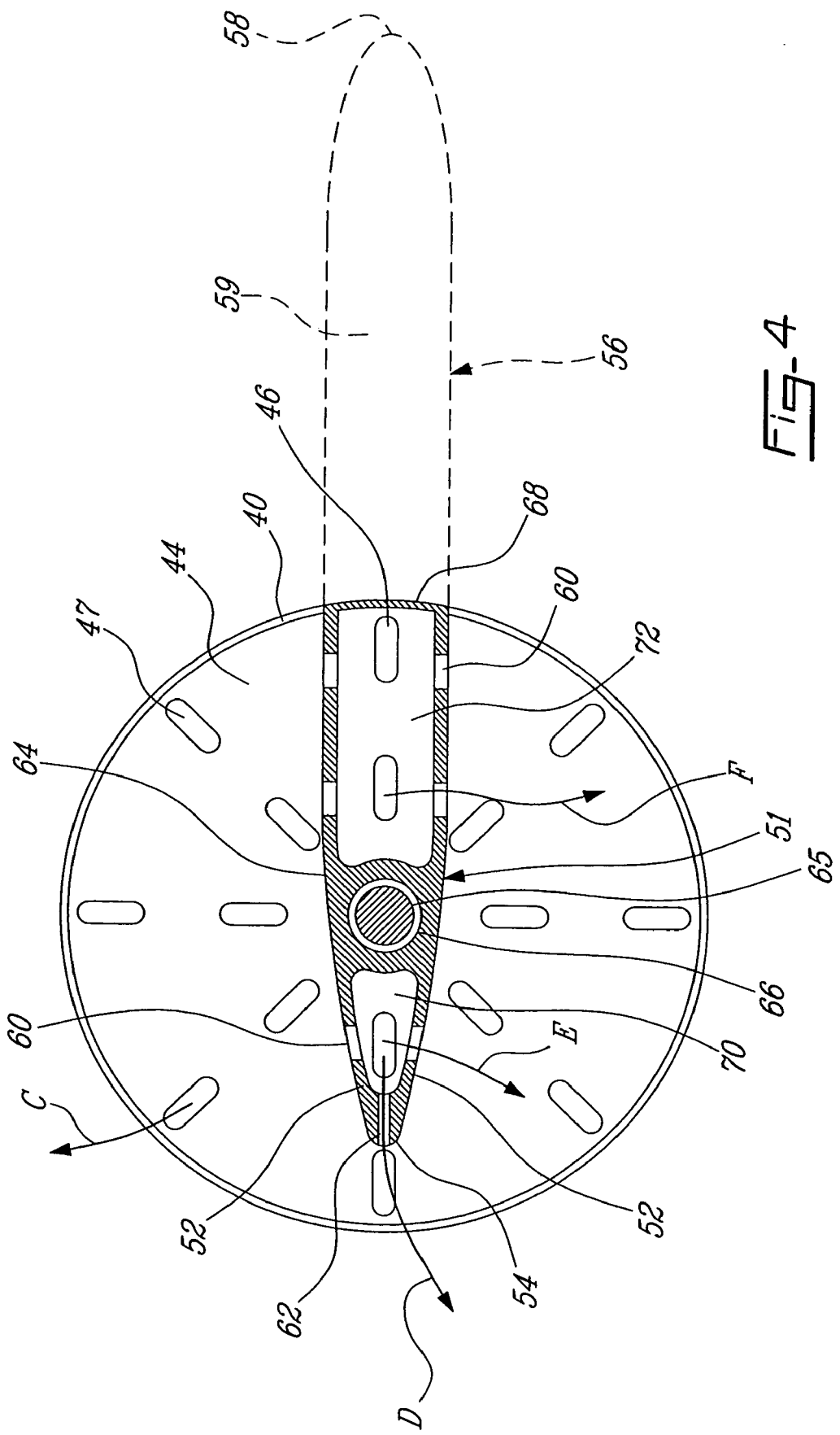
FIG. 4 is a top cross-sectional view of the bleed valve of FIG. 2.

Referring to FIGS. 2 to 4, the compressor 14 also comprises a plurality of bleed valves such as shown at 20 for reducing air pressure within the primary flow path 34 by directing air from the primary flow path 34 into the bypass flow path 26. The bleed valve 20 comprises a static hollow portion or valve body 22 cooperating with a mobile valve assembly or piston 24 to open and close a fluid flow communication between the bypass flow path 26 and the primary flow path 34. The static portion 22 comprises a strut-shaped housing or strut portion 51 which extends across the bypass flow path 26 and includes opposed inner and outer walls 44,45 interconnected by two strut walls 52 and a transverse wall 68 (see FIG. 4). The inner wall 44 is preferably circular and completely occupies a corresponding hole in the inner shroud 30 such as to form a continuous flow path surface therewith. Similarly, the outer wall 45 is preferably circular and completely occupies a corresponding hole in the outer shroud 28 such as to form a continuous flow path surface therewith. Having the inner and outer walls 44,45 separate from the inner and outer shrouds 30,28 is preferred such that the valve 20 can be a self-contained unit easily removable from the engine 10. However, it is also considered in an alternative embodiment to have the inner and outer walls 44,45 as integral portions of respectively the inner and outer shrouds 30,28.

As shown in FIG. 4, the strut walls 52 are joined together at one end to define a strut trailing edge 54 and are interconnected at the other end by the transverse wall 68, thus forming a closed perimeter. The strut walls 52 form a continuous aerodynamic profile with a structural strut portion 59, which extends from a leading edge 58 to the transverse wall 68, in order to form a complete strut profile 56. In other words, the strut portion 51, which is the only portion of the valve 20 located within the bypass flow path 26, mimics the profile of part of a strut and as such, in combination with the structural strut portion 59, produces the same bypass flow perturbations than standard struts which are necessary for ensuring structural integrity of the bypass flow path 26. Thus, it can be said that the bypass flow is not affected by the presence of the bleed valve 20 therein. Alternatively, the strut walls 52 and transverse wall 68 can be replaced, for example, by a single, arcuate wall forming a closed perimeter, or by an increased number of interconnected walls also forming a closed perimeter.

Advantageously, in the case where the inner and outer walls 44,45 are respectively integral portions of the inner and outer shrouds 30,28, the strut portion 51 also acts as a structural strut portion, i.e. the strut portion is adapted to transfer loads between the inner and outer shrouds 30,28 similarly to the structural strut portion 59 and remaining struts of the engine 10.

The strut walls 52 are also interconnected, between the trailing edge 54 and the transverse wall 68, by a central portion 64. Thus, a first chamber 70 is defined between the inner and outer walls 44,45, bordered by the strut walls 52 and the central portion 64. Similarly, a second chamber 72 is defined between the inner and outer walls 44,45, bordered by the strut walls 52, central portion 64 and transverse wall 68.

The inner wall 44 has a plurality of openings or slots 46,47 defined therethrough, some slots 46 communicating with the first and second chambers 70,72, and some slots 47 defined outside of the chambers 70,72 and communicating directly with the bypass flow path 26. The strut walls 52 also includes a plurality of openings or slots 60 defined therethrough and creating a fluid flow communication between the bypass flow path 26 and the first and second chambers 70,72. Additionally, a plurality of openings or slots 62 are defined through the strut walls 52 at the junction therebetween, i.e. at the trailing edge 54, creating further fluid flow communication between the first chamber 70 and the bypass flow path 26.

The static portion 22 also comprises an outer flange 49 substantially parallel to the outer wall 45 and located outward thereof and a connecting portion 55 extending between the outer wall 45 and the outer flange 49. The outer flange 49 rests against and is detachably connected to flanges or support structures 57 extending outward from the outer shroud 28 around the outer wall 45, for example through mechanical fasteners (not shown), to retain the valve 20 in place within the engine 10.

The static portion 22 further comprises a housing 38 which is located outside of the bypass flow path 26 within the plenum 32. The housing 38 includes a cylindrical wall 40 extending inwardly from the inner wall 44, i.e. away from the bypass flow path 26, and forming a closed perimeter. The cylindrical wall 40 preferably abuts flanges or support structures 53 extending inward from the inner shroud 30 around the inner wall 44 such as to retain the housing 38 against movement in the axial direction of the engine 10, i.e. in a direction parallel to the central axis 11. A flange or valve seat 50 extends from the cylindrical wall 40, around the perimeter and toward the inside of the housing 38, and borders an open inner end 42 of the housing 38. Preferably, the cylindrical wall 40 extends beyond the flange 50. It is also considered to replace the cylindrical wall 40 by a plurality of interconnected walls forming a closed perimeter of an appropriate shape, and/or have the flange 50 extending from the extremity of the wall 40.

A third chamber 71 is formed within the housing 38, defined between the inner wall 44 and the flange 50 and bordered by the cylindrical wall 40. The third chamber 71 is thus in fluid flow communication with the plenum 32 through the open inner end 42, with the first and second chambers 70,72 (which are in fluid flow communication with the bypass flow path 26 through the strut wall slots 60,62) through the inner wall slots 46, and directly with the bypass flow path 26 through the inner wall slots 47.

The mobile valve assembly or piston 24 comprises a piston shaft 66 connected to a piston head or valve member 48. The shaft 66 extends across the bypass flow path 26 within a cylindrical bore 65 defined through the inner wall 44, central portion 64, outer wall 45, connecting portion 55 and outer flange 49, and within the third chamber 71 where the piston head 48 is preferably located. The piston head 48 is moved by the shaft 66 between a first position, where it abuts the flange 50 and seals the open inner end 42 (see FIG. 2) and a second position, where it is displaced toward the inner wall 44 within the chamber 71 to create an annular opening 76 between the piston head 48 and the flange 50 (see FIG. 3). Thus, with the piston head 48 in the second position, the primary flow path 34 is in fluid flow communication with the bypass flow path 26 through the plenum 32, annular opening 76, and either the inner wall slots 47 or the inner wall slots 46 and strut wall slots 60,62. It can be appreciated from FIG. 3 that the piston head 48 is located outside of the bypass flow path 26 even when moved to the second, or opened, position. In other words, the piston head 48 remains outside of an exterior space 43 extending outside of the closed perimeter formed by the strut walls 52 and transverse wall 68, between the inner and outer walls 44,45.

A hydraulic actuator 74 is located outward of the outer wall 45, preferably connected to the outer flange 49 such that the valve 20 can be a self-contained unit easily removable from the engine 10. The piston shaft 66 is connected to the hydraulic actuator 74 such as to be actuated thereby. The working fluid of the hydraulic actuator 74 is preferably engine fuel, which is precisely metered by an engine control unit (not shown). Since the engine fuel is precisely metered by engine controls in relation to altitude, temperature and engine rotational speed, no potentiometers or similar means are necessary for position control feedback of the piston head 48, thus simplifying the manufacture and maintenance of the valve 20.

Referring to FIG. 3, in use, engine fuel is diverted from the fuel source (not shown) of the gas turbine engine, and via the fuel metering unit (not shown) enters the actuator 74. When the fluid pressure becomes too high in the primary flow path 34, the engine fuel powers the actuator 74 to actuate the piston head or valve member 48 through the piston shaft 66 to move the piston head 48 away from the flange or valve seat 50 and create the annular opening 76. The increased fluid pressure in the primary flow path 34, and in the plenum 32 in fluid flow communication with the primary flow path 34 through the openings 36 in the primary flow path outer wall 37, will produce an outward force on the piston head 48 which will assist the outward movement of the piston head 48, i.e. toward the inner wall 44, necessary to create the annular opening 76. Fluid is then evacuated from the primary flow path 34 to the plenum 32 through the openings 36 (indicated by arrow A), then to the third chamber 71 through the annular opening 76 (indicated by arrow B), then to the bypass flow path 26 either directly through the inner wall slots 47 (indicated by arrow C, also shown in FIG. 4), or through the inner wall slots 46, first chamber 70 and strut wall slots 60,62 (indicated by arrows D and E, also shown in FIG. 4), or through the inner wall slots 46, second chamber 72 and strut wall slots 60 (indicated by arrow F shown in FIG. 4 only). When the fluid pressure within the primary flow path 34 has returned to an acceptable level, the reduced fuel pressure brings the actuator 74 to actuate the piston head 48 through the piston shaft 66 to close the annular opening 76 and seal the inner end 42 of the housing 38, thus breaking the fluid flow communication between the primary and bypass flow paths 34,26.

Figure 5:
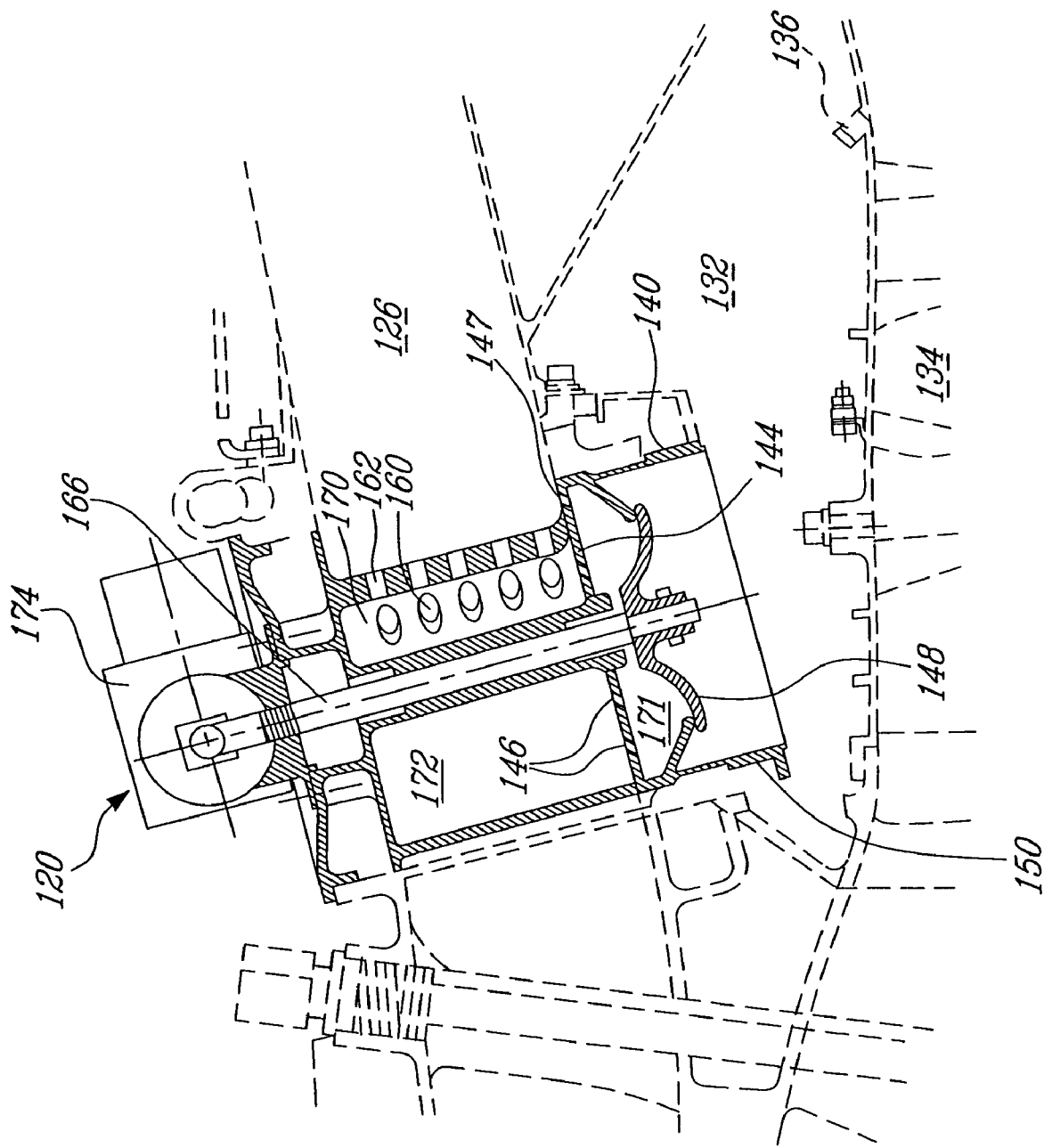
FIG. 5 is a side cross-sectional view of a bleed valve according to an alternate embodiment of the present invention, showing the valve in a closed position and installed in a portion of a gas turbine engine such as illustrated in FIG. 1.
Figure 6:
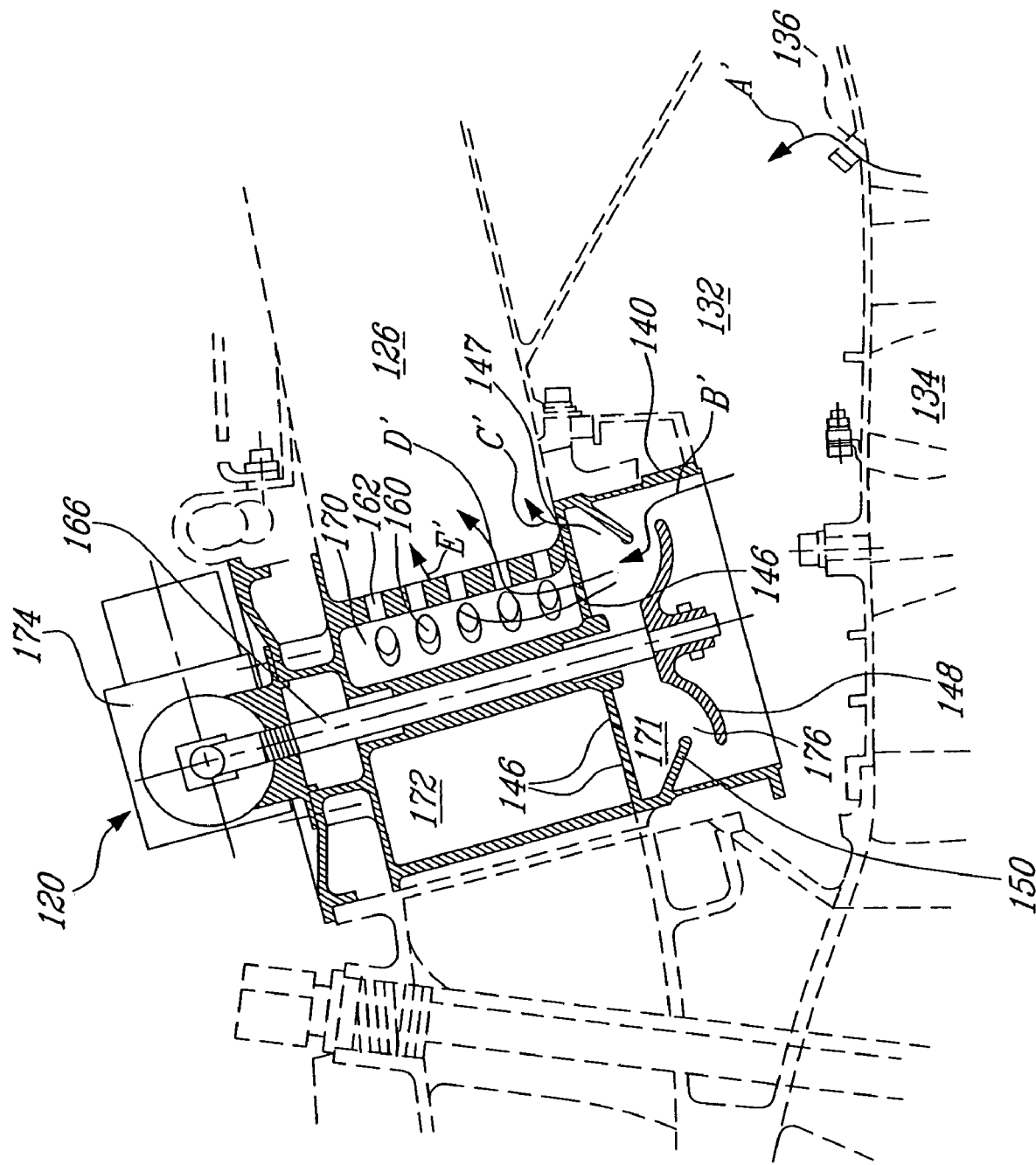
FIG. 6 is a side cross-sectional view of the bleed valve and portion of the gas turbine engine of FIG. 5 showing the valve in an opened position.

Referring to FIGS. 5 and 6, an alternative bleed valve 120 is shown, the components of the bleed valve 120 not described herein being identical or similar to the corresponding components of the bleed valve 20. The bleed valve 120 essentially differs from the bleed valve 20 in that the piston head 148, which is shown in the closed position in FIG. 5 and in the opened position in FIG. 6, is located outside and inward of the third chamber 171, and abuts the flange 150 from the outside. The actuator 174, through the piston shaft 166, actuates the piston head 148 from the closed to the opened position through an inward movement of the piston head 148, i.e. away from the inner wall 144. Preferably, the cylindrical wall 140 extends from the flange 150 sufficiently inwardly to contain the piston head 148 in the opened position, in order to protect the piston head 148 from potential shocks. The actuator 174 will require a greater force to open the annular opening 176 than the actuator 74 requires to open the annular opening 76 since the movement of the piston head 148 toward the opened position is done against the fluid pressure within the primary flow path 134, and becomes harder as the fluid pressure within the primary flow path 134 increases.

Referring to FIG. 6, in use, the valve 120 functions similarly to the valve 20 in that when the fluid pressure becomes too high in the primary flow path 134, the actuator 174, driven by the engine fuel, actuates the piston head 148 through the piston shaft 166 to move the piston head 148 away from the flange 150 and create the annular opening 176. Fluid is then evacuated from the primary flow path 134 to the plenum 132 through the openings 136 (indicated by arrow A'), then to the third chamber 171 through the annular opening 176 (indicated by arrow B'), then to the bypass flow path 126 either directly through the inner wall slots 147 (indicated by arrow C'), or through the inner wall slots 146, first chamber 170 and strut wall slots 160,162 (indicated by arrow D' and E'), or through the inner wall slots 146, second chamber 172 and strut wall slots 160 (not shown—see arrow F of previous embodiment, FIG. 4). When the fluid pressure within the primary flow path 134 has returned to an acceptable level, the actuator 174 actuates the piston head 148 to close the annular opening 176, thus breaking the fluid flow communication between the primary and bypass flow paths 134,126.

The bleed valve 20,120 presents several advantages, one of which being that the valve 20,120 with actuator 74,174 forms a self-contained unit removable from the outside of the engine for maintenance purposes. Also, as stated above, the fuel actuator 74,174 does not require position feedback means, such as potentiometer, in order to accurately activate the piston 24, which reduces the cost and complexity of the bleed valve 20,120. The portion of the bleed valve 20,120 extending across the bypass flow path 26,126 forms a continuous profile with one of the struts 56 of the engine 10 and as such the valve 20,120 causes no additional perturbation in the bypass flow.

The above description is meant to be exemplary only, and one skilled in the art will recognize that changes may be made to the embodiments described without department from the scope of the invention disclosed. For example, the bleed valve 20,120 could be used in other types of engines, such as an industrial gas turbine engine or a turboprop engine. Also, the bleed valve 20,120 could be actuated by other types of actuators, such as pneumatic or electric actuators. The piston head 48 could be replaced by any other appropriate type of valve member, and the flange 50 could be replaced by any other appropriate type of valve seat corresponding to the valve member to allow the fluid flow communication between the bypass flow path 26 and primary flow path 34 to be alternatively opened and closed. Alternatively, the valve member 48 could be contained and displaced within the valve body 22, and as such would remain outside of the exterior space 43 and not perturb the flow in the bypass flow path 26. The strut portion 51 could be alternatively shaped to have a different aerodynamic profile adapted to the environment of the valve 20,120. Still other modifications which fall within the scope of the present invention will be apparent to those skilled in the art, in light of a review of this disclosure, and such modifications are intended to fall within the appended claims.

What is claimed is:

1. A compressor bleed valve arrangement for a gas turbine engine having a central axis, the compressor bleed valve arrangement comprising a bleed valve for selectively bleeding air from a main flow path to a bypass flow path, the main flow path being located inwardly of the bypass flow path relative to the central axis of the gas turbine engine, the bleed valve being accessible from an outward side of the bypass flow path relative to the central axis, the bleed valve having a static valve body extending across the bypass flowpath and housing a mobile valve assembly moveable therewithin between closed and open positions, the mobile valve assembly being isolated from the bypass flow path by the static valve body, and an actuator provided at the outward side of the bypass flow path, and wherein the mobile valve assembly comprises a piston head operatively connected to the actuator via a piston rod extending through the valve body.

2. The compressor bleed valve arrangement as defined in claim 1, wherein only static parts of the bleed valve are exposed to the bypass flow path.

3. The compressor bleed valve arrangement as defined in claim 1, wherein the piston head remains outside of the bypass flow path while being moved between said open and closed positions.

4. The compressor bleed valve arrangement as defined in claim 1, wherein said valve body has an exterior strut-like profile.

5. The compressor bleed valve arrangement as defined in claim 1, wherein the mobile valve assembly is actuated with a hydraulic actuator with engine fuel as working fluid.

6. A bleed valve for a gas turbine engine, the gas turbine engine having a bypass flow path and a primary flow path located inwardly of the bypass flow path, the bleed valve comprising:
   a chamber located outside and inwardly of the bypass flow path, the chamber being defined by a first wall having at least one opening defined therein and providing a first fluid flow communication between the chamber and the bypass flow path, at least one second wall extending from the first wall and forming a closed perimeter, and a valve seat connected to the at least one second wall, the valve seat bordering a second fluid flow communication between the chamber and the primary flow path;
   a valve member for selectively closing and opening the second fluid flow communication through respectively engagement with and disengagement from the valve seat, the valve member being located outside and inwardly of the bypass flow path when closing and opening the second fluid flow communication; and
   an actuator actuating the valve member to alternatively close and open the second fluid flow communication, the actuator actuating the valve member across the bypass flow path.

7. The bleed valve as defined in claim 6, wherein the chamber is a first chamber and the bleed valve further comprises a valve body having a plurality of interconnected third walls extending from the first wall across the bypass flow path, the third walls defining at least one second chamber and having at least one hole defined therein to provide fluid flow communication between the at least one second chamber and the bypass flow path, and the first chamber is in fluid flow communication with the at least one second chamber through the at least one opening in the first wall.

8. The bleed valve as defined in claim 6, wherein the valve member is actuated by the actuator through a shaft extending within the valve body.

9. The bleed valve as defined in claim 6, wherein the first wall is located within a corresponding hole in an inner shroud defining the bypass flow path, the first wall being substantially aligned with the inner shroud.

10. The bleed valve as defined in claim 7, wherein the valve body forms part of a strut of the gas turbine engine.

11. The bleed valve as defined in claim 6, wherein the valve member is a piston head, the valve seat is a flange extending from the at least one second wall, and the piston head abuts the flange from the inside of the chamber to close the second fluid flow communication and is moved toward the bypass flow path to open the second fluid flow communication.

12. The bleed valve as defined in claim 6, wherein the valve member is a piston head, the valve seat is a flange extending from the at least one second wall, and the piston head abuts the flange from the outside of the chamber to close the second fluid flow communication and is moved away from the bypass flow path to open the second fluid flow communication.

13. The bleed valve as defined in claim 6, wherein the actuator is a hydraulic actuator using engine fuel as a hydraulic fluid.

14. A compressor bleed valve arrangement for a gas turbine engine having a central axis, the compressor bleed valve arrangement comprising a bleed valve for selectively bleeding air from a main flow path to a bypass flow path, the main flow path being located inwardly of the bypass flow path relative to the central axis of the gas turbine engine the bleed valve being accessible from an outward side of the bypass flow path relative to the central axis, the bleed valve having a static valve body extending across the bypass flowpath and housing a mobile valve assembly moveable therewithin between closed and open positions, the mobile valve assembly being isolated from the bypass flow path by the static valve body, wherein the mobile valve assembly is actuated with a hydraulic actuator with engine fuel as working fluid.

15. The compressor bleed valve arrangement as defined in claim 14, wherein the static valve body has a chamber located outside and inwardly of the bypass flow path, the chamber being defined by a first wall having at least one opening defined therein and providing a first fluid flow communication between the chamber and the bypass flow path, at least one second wall extending from the first wall and forming a closed perimeter, and a valve seat connected to the at least one second wall, the valve seat bordering a second fluid flow communication between the chamber and the primary flow path.

* * * * *